(12) United States Patent
Price

(10) Patent No.: US 7,490,147 B2
(45) Date of Patent: Feb. 10, 2009

(54) METHOD AND APPARATUS FOR COLLECTING PERFORMANCE DATA IN A COMPUTER APPLICATION

(75) Inventor: Robert Allen Price, Houston, TX (US)

(73) Assignee: BMC Software, Inc., Houston, TX (US)

( * ) Notice: Subject to any disclaimer, the term of this patent is extended or adjusted under 35 U.S.C. 154(b) by 788 days.

(21) Appl. No.: 10/012,114

(22) Filed: Dec. 7, 2001

(65) Prior Publication Data

US 2003/0110251 A1    Jun. 12, 2003

(51) Int. Cl.
G06F 15/173    (2006.01)
G06F 9/44    (2006.01)

(52) U.S. Cl. .................................. 709/224; 717/127

(58) Field of Classification Search ........................ None
See application file for complete search history.

(56) References Cited

U.S. PATENT DOCUMENTS

| | | | |
|---|---|---|---|
| 5,615,357 A * | 3/1997 | Ball | 703/21 |
| 5,701,471 A * | 12/1997 | Subramanyam | 707/200 |
| 5,860,069 A | 1/1999 | Wright | 707/4 |
| 6,006,259 A * | 12/1999 | Adelman et al. | 709/223 |
| 6,754,612 B1 * | 6/2004 | Vanfladern et al. | 702/186 |
| 6,873,934 B1 * | 3/2005 | Rodrigues et al. | 702/186 |

OTHER PUBLICATIONS

Mukherjee, Arup and Siewiorek, Daniel P. "Measuring Software Dependability by Robustness Benchmarking," Jun. 1997, vol. 23, Issue 6, IEEE, pp. 1-13.*
Mehrotra, Amit et al., "Benchmarking and Analysis of Architectures for CAD Applications," Oct. 1997, IEEE, pp. 670-675.*
Jones, Capers, "Software Benchmarking," Oct. 1995, vol. 28, Issue 10, pp. 102-103.*

* cited by examiner

*Primary Examiner*—Patrice Winder
*Assistant Examiner*—Azizul Choudhury
(74) *Attorney, Agent, or Firm*—Vinson & Elkins L.L.P.

(57) ABSTRACT

The present invention is a method and apparatus for measuring the performance of a subroutine in a software application executing upon a computer system. When characterized as a method, a monitoring application operating according to the present invention first intercepts a call to a subroutine. The monitoring application then examines a system clock. If the clock is in a particular configuration, the monitoring application collects a first set of performance data. Next, the monitoring application passes control to the subroutine. When the subroutine completes, control is returned to the monitoring application. The monitoring application then collects a second set of performance data. The first and second sets of data are then compared to determine the performance characteristics of the subroutine. If the clock in not in the particular configuration, the monitoring application passes control to the subroutine in such a way that processing continues as it would if the monitoring program had never been called.

24 Claims, 1 Drawing Sheet

METHOD AND APPARATUS FOR COLLECTING PERFORMANCE DATA IN A COMPUTER APPLICATION

BACKGROUND OF THE INVENTION

1. Technical Field

The present invention relates generally to a method and apparatus for gathering data to measure the performance of a computer program. More specifically, the present invention describes a way to periodically sample performance data during the execution of a computer program to determine the time it takes to perform certain operations.

2. Description of the Related Art

Measuring the performance of computer programs has always been difficult. As is true in many other disciplines, the more closely a system is monitored, the more the system is affected by the monitoring process. In computer programs, the more closely a program is monitored by another program, the more overhead the monitoring program imposes on the system executing the program being monitored. Often times, this overhead adversely affects the monitored program.

For example, one program may collect various information about another program executing on the same computer system every minute. Since the monitoring program only collects data every minute, the overhead imposed by this program is small compared to the monitored program. However, if the monitoring program attempted to collect the same information every tenth of a second, the processor upon which the monitored program is executing may spend as much time executing the monitoring program as it does the monitored program. In most instances, this situation would be unacceptable.

Thus, there exists a need to measure the performance of a computer program by imposing a minimum amount of overhead on the system executing the program. Such a measurement technique should be simple to implement and allow the rate at which data is sampled to be varied.

SUMMARY OF THE INVENTION

Generally, the present invention is a method and apparatus for measuring the performance of a subroutine in a software application executing upon a computer system. When characterized as a method, a monitoring application operating according to the present invention first intercepts a call to a subroutine. The monitoring application then examines a system clock. If the clock is in a particular configuration, the monitoring application collects a first set of performance data. Next, the monitoring application passes control to the subroutine. When the subroutine completes, control is returned to the monitoring application. The monitoring application then collects a second set of performance data. The first and second sets of data are then compared to determine the performance characteristics of the subroutine. If the clock in not in the particular configuration, the monitoring application passes control to the subroutine in such a way that processing continues as it would if the monitoring program had never been called.

BRIEF DESCRIPTION OF THE DRAWINGS

The novel features which are believed to be characteristic of the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

The particular embodiment of the invention described herein consists of an improvement to the invention described in U.S. Pat. No. 5,860,069, issued on Jan. 12, 1999, entitled "Method of Efficient Collection of SQL Performance Measures," which is hereby incorporated by reference. The '069 patent describes a method of measuring and monitoring the processing of SQL queries in the IBM Database 2 (DB2) software program. This method involves searching the Master Entry Point List (MEPL) in DB2 for the entry point to the SQL processing subroutine DSNXERD. (As used herein, the term "subroutine" refers to any group of instructions that is called or invoked by another set of instructions.) Next, the DSNXERD subroutine is scanned for entry points to the SQL Data Manipulation Language processing subroutine DSNXERT. The entry points to DSNXERT in DSNXERD are then replaced with entry points to a monitoring program named Apptune.

In the absence of Apptune, DB2 calls DSNXERD to process SQL statements. In turn, DSNXERD calls DSNXERT to process DML statements then returns control back to DSNXERD. As described in the '069 patent, Apptune inserts itself into this process by replacing the entry points to DSNXERT with entry points to itself. Thus, when DSNXERD attempts to call DSNXERT, it is, in actuality, calling Apptune. Upon being called by DSNXERD, Apptune collects a first set of data. Apptune then calls DSNXERT, much as DSNXERD would do normally. When DSNXERT finishes executing, it returns control to Apptune instead of DSNXERD. Upon being given control by the return from DSNXERT, Apptune collects a second set of data. The first and second sets of data are then compared to yield performance measurements of this important portion of DB2.

The present invention improves upon this mode of operation by modifying Apptune so that it does not collect performance data every time a call is made to DSNXERD/DSNXERT. By only collecting data during some of the calls, the overhead Apptune places on DB2 is significantly decreased. This, in turn, allows for greater performance, since significant amounts of Apptune code do not have to be executed every time a call is made to DSNXERD.

The present invention places logic very near the portion of Apptune that is substituted for the DSNXERT entry point. This logic analyzes various bits in the system clock. When the bits are in a certain configuration, Apptune samples data as described in the '069 patent. When the bits are in a different configuration, however, Apptune passes control to DSNXERT as if it were called by DSNXERD and allows processing to occur exactly as it would in the absence of Apptune.

Figure 1:
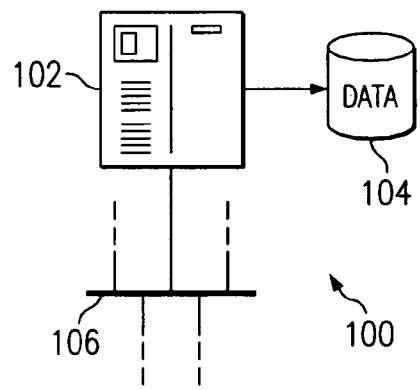
FIG. 1 illustrates a computer system upon which the present invention can be implemented.

FIG. 1 shows a computer system upon which the present invention can be implemented. In a preferred embodiment, computer system 100 is composed of processing unit 102, storage unit 104 and network 106. In a particular embodiment, processing unit 102 is an IBM 390 mainframe computer running IBM's DB2 database application. Computer system 100 can be implemented in a variety of ways. These particular implementations depend upon a number of factors, such as how the computer system will be used and the technology available at the time the system is implemented.

Figure 2:
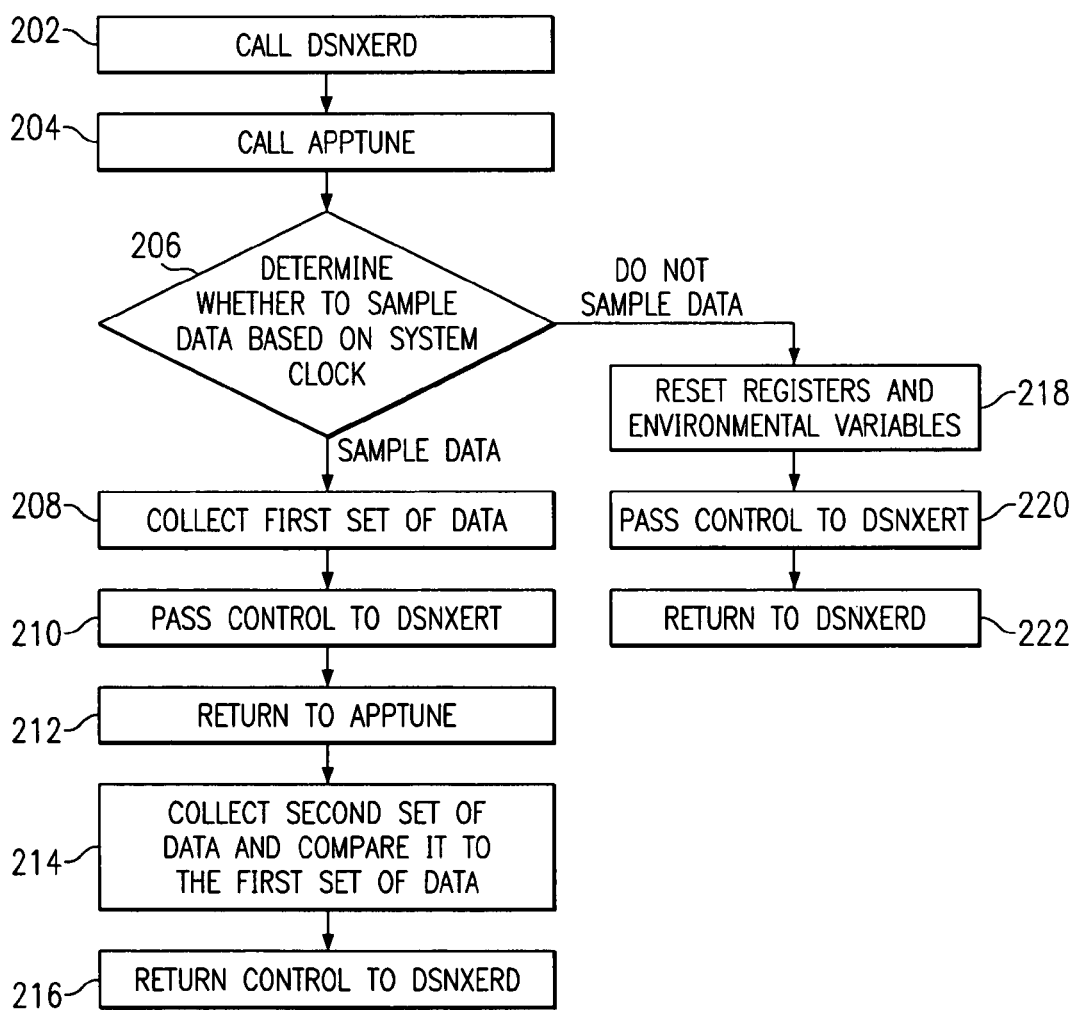
FIG. 2 is a flowchart showing the operation of the present invention.

FIG. 2 is a flowchart showing the operation of the present invention. The process illustrated in FIG. 2 begins with DB2 calling DSNXERD to process an SQL statement. Upon being called by DB2, DSNXERD runs for some period of time, then it attempts to call DSNXERT (202). When DSNXERD attempts to call DSNXERT, however, Apptune is executed instead, since Apptune previously replaced the entry points to DSNXERT in DSNXERD with entry points to itself. At this point, Apptune analyzes the bits in the system clock to determine whether it should sample data at this particular time or not (204).

This analysis can take on a variety of forms. For example, by looking at any particular bit, Apptune can collect performance data half of the time (e.g., if the bit is high—sample, if the bit is low—do not sample). Preferably, Apptune would look at the least significant bit that is practical when operating in this mode. Care is needed when using the output of the IBM STCK instruction, because the bits to the extreme right of the output are used to designate the CPU where the STCK was done, and do not change at all on a given CPU. In addition, for very slow processors, IBM's Principles of Operations Manual allows IBM the option of incrementing bits to the left of bit 51. Apptune could also look for a particular combination of any two bits to collect performance data 25% of the time, a particular combination of three bits to sample data 12.5% of the time, and so on.

In addition, Apptune can collect performance data for an arbitrary percentage of time by multiplying the percentage of time one wishes Apptune to collect data by the number of possible unique combinations of the system clock. For example, assuming that one wants to monitor data 33% of the time and 8 bits are being sampled in the system clock, one would multiple 0.33 and 256($2^8$) to arrive at 84. Apptune could then collect data approximately ⅓ of the time by collecting data when the system clock was less than 84(01010100 binary).

The entire system clock does not have to be examined to implement the present invention. For example, if the system clock is an 8-byte value, one may choose to look at only the sixth byte of the clock. As discussed above, examining the least significant portions of the system clock allows the monitored subroutines to be examined more evenly over a given period of time, assuming the least significant portion of the system clock changes most frequently. Thus, when reference is made to examining the system clock, it should be understood that this does not require the entire system clock to be examined.

A user may change the rate at which Apptune samples data at any time by specifying a new value with which to compare to the system clock. This value may be a percentage value between 1 and 100, or a user may have to chose one value from a set number of choices (e.g., 100%, 50%, 25%, 12.5%, or 0%). Further, depending upon how the logic for comparing a value with the system clock is implemented, a user may be able to specify other values.

If after examining the system clock, Apptune determines that it should not collect performance data at the present time, Apptune sets the processor registers and other environmental variables so that when Apptune calls DSNXERT, it appears that DSNXERD made the call instead of Apptune (218). As a consequence of this manipulation, when DSNXERT executes a RETURN statement, execution begins at the instruction in DSNXERD immediately following the original call to Apptune. After setting the registers and environmental variables, Apptune passes control to DSNXERT as if it had been called by DSNXERD (220). DB2 then continues to process the SQL statement as it would in the absence of Apptune, with DSNXERT executing for a while before returning to DSNXERD (222).

If Apptune determines that it should collect performance data, processing continues as described in the '069 patent. Specifically, Apptune collects a first set of performance data (208), then calls DSNXERT (210). When DSNXERT completes, DSNXERT returns control back to Apptune (212). At this point in the '069 patent and in the present invention, Apptune collects a second set of data to compare to the set it originally collected when DSNXERD attempted to call DSNXERT (214). The first and second sets of data can then be compared to determine a number of performance metrics, such as how long it took DSNXERT to process a given piece of information. When Apptune finishes this comparison, control is returned to DSNXERD (216).

Operating in this fashion has several advantages over other approaches to periodically collect data in a mainframe environment. A timer could be set to activate the data collection process. This approach, however, adds additional overhead and involves cross address space communication. Communications between processes in different address spaces does not always occur in a timely fashion when the system is under load. In these situations, Apptune may not be activated when it should, thereby resulting in inaccurate performance measures.

As indicated above, aspects of this invention pertain to specific "method functions" that can be implemented through various computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writeable storage media (e.g. read only memory devices within a computer such as ROMs or CD-ROM disks readable only by a computer I/O attachment); (b) information alterably stored on writeable storage media (e.g. floppy disks and hard drives); or (c) information conveyed to a computer through communication media, such as a local area network (LAN), a telephone network, or a public network like the Internet. It should be understood, therefore, that such media, when carrying computer readable instructions that direct the method functions of the present invention, represent alternate embodiments of the present invention.

While the invention has been particularly shown and described with reference to a preferred embodiment, it will be understood by those skilled in the art that various changes in form and detail may be made therein without departing from the spirit and scope of the invention.

The invention claimed is:

1. A method for measuring the performance of a subroutine in a software application executing upon a computer system, comprising:
   intercepting a call to the subroutine;
   examining one or more preselected bits which comprise less than all bits of a system clock;
   based on the examination of the one or more preselected bits of the system clock, determining using either hardware or software whether or not to collect a first and second set of performance data;
   collecting the first set of performance data if a determination is made to collect performance data;
   calling the subroutine;

collecting the second set of performance data after the subroutine finishes executing if the determination is made to collect performance data; and comparing the first set of performance data to the second set of performance data if the determination is made to collect performance data, wherein the performance of the subroutine can be measured.

2. The method as recited in claim 1, further comprising:
intercepting a second call to the subroutine;
examining the system clock a second time;
based on the second examination of the system clock, determining using either hardware or software whether or not to collect performance data for the second call to the subroutine;
setting registers and environmental variables; and
if a determination is made not to collect performance data, calling the subroutine without collecting performance data.

3. The method as recited in claim 2, wherein the intercepting step further comprises substituting an address for a monitoring program for the address of the subroutine.

4. The method as recited in claim 1, wherein the determining step further includes multiplying the number of possible combinations of the system clock by a user-supplied value specifying a percentage of time the subroutine is to be monitored.

5. The method as recited in claim 3, further comprising the subroutine returning control to a monitoring program.

6. The method as recited in claim 3, wherein the software application is an IBM Database 2 program.

7. A computer adapted to measure the performance of a subroutine in a software application executing upon the computer, wherein the computer comprises a second software program for obtaining performance data, wherein the second software program:
intercepts a first call to the subroutine;
examines one or more preselected bits of a system clock associated with the computer;
based on the examination of the one or more preselected bits which comprise less than all bits of the system clock, determines using either hardware or software whether or not to collect a first and second set of performance data;
collects the first set of performance data if a determination is made to collect performance data;
calls the subroutine;
collects the second set of performance data after the subroutine finishes executing if the determination is made to collect performance data; and
compares the first set of performance data to the second set of performance data if the determination is made to collect performance data, wherein the performance of the subroutine can be measured.

8. The computer as recited in claim 7, wherein the second software program also:
intercepts a second call to the subroutine;
examines the system clock;
based on the examination of the system clock, determines using either hardware or software whether or not to collect performance data for the second call to the subroutine;
sets registers and environmental variables; and
if a determination is made not to collect performance data, calls the subroutine without collecting performance data.

9. The computer as recited in claim 8, wherein the second software program substitutes an address for a monitoring program for the address of the subroutine as part of the intercepting step.

10. The computer as recited in claim 7, wherein the determining step further includes the second software program multiplying the number of possible combinations of the system clock by a user-supplied value specifying a percentage of time the subroutine is to be monitored.

11. The computer as recited in claim 9, wherein the second software program returns control to a monitoring program after the subroutine finishes executing.

12. The computer as recited in claim 9, wherein the software application is an IBM Database 2 program.

13. A computer-readable storage medium comprising a computer software program for measuring the performance of a subroutine in a software application executing upon a computer, wherein the program comprises instructions for performing the following steps:
intercepting a first call to a subroutine of a software application;
examining one or more preselected bits which comprise less than all bits of a system clock associated with the computer;
based on the examination of the one or more preselected bits of the system clock, determining whether or not to collect a first and second set of performance data;
collecting the first set of performance data if a determination is made to collect performance data;
calling the subroutine;
collecting the second set of performance data after the subroutine finishes executing if the determination is made to collect performance data; and
comparing the first set of performance data to the second set of performance data if the determination is made to collect performance data, wherein the performance of the subroutine can be measured.

14. The computer-readable storage medium as recited in claim 13, wherein the steps further comprise:
intercepting a second call to the subroutine;
examining the system clock;
based on the examination of the system clock, determining whether or not to collect performance data for the second call to the subroutine;
setting registers and environmental variables; and
calling the subroutine without collecting performance data if a determination is made not to collect performance data.

15. The computer-readable storage medium as recited in claim 14, wherein the intercepting step further includes substituting an address for a monitoring program for the address of the subroutine.

16. The computer-readable storage medium as recited in claim 13, wherein the determining step further includes multiplying the number of possible combinations of the system clock by a user-supplied value specifying a percentage of time the subroutine is to be monitored.

17. The computer-readable storage medium as recited in claim 15, wherein the steps further comprise returning control to a monitoring program after the subroutine finishes executing.

18. The computer-readable storage medium as recited in claim 15, wherein the software application is an IBM Database 2 program.

19. The method according to claim 1 wherein the one or more preselected bits of the system clock comprise a least significant bit of the system clock.

20. The method according to claim 1 wherein the one or more preselected bits of the system clock comprise a particular combination of any plurality of bits of the system clock.

21. The computer according to claim 7 wherein the one or more preselected bits of the system clock comprise a least significant bit of the system clock.

22. The computer according to claim 7 wherein the one or more preselected bits of the system clock comprise a particular combination of any plurality of bits of the system clock.

23. The computer-readable storage medium according to claim 13 wherein the one or more preselected bits of the system clock comprise a least significant bit of the system clock.

24. The computer-readable storage medium according to claim 13 wherein the one or more preselected bits of the system clock comprise a particular combination of any plurality of bits of the system clock.

* * * * *